US008698835B1

(12) United States Patent
Shiplacoff

(10) Patent No.: US 8,698,835 B1
(45) Date of Patent: Apr. 15, 2014

(54) MOBILE DEVICE USER INTERFACE HAVING ENHANCED VISUAL CHARACTERISTICS

(71) Applicant: Google Inc., Mountain View, CA (US)

(72) Inventor: Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/854,806

(22) Filed: Apr. 1, 2013

Related U.S. Application Data

(60) Provisional application No. 61/714,680, filed on Oct. 16, 2012, provisional application No. 61/789,029, filed on Mar. 15, 2013.

(51) Int. Cl.
*G09G 5/02* (2006.01)
(52) U.S. Cl.
USPC .......................... 345/589; 715/762; 715/763
(58) Field of Classification Search
USPC .................................. 345/589; 715/762, 763
See application file for complete search history.

(56) References Cited

U.S. PATENT DOCUMENTS

| 7,440,006 | B2 * | 10/2008 | Lin et al. ........................ 348/173 |
| 7,752,466 | B2 * | 7/2010 | Ginter et al. ................... 713/194 |
| 7,907,776 | B2 * | 3/2011 | Ubillos ........................ 382/167 |
| 7,917,749 | B2 * | 3/2011 | Ginter et al. ................... 713/164 |
| 8,429,557 | B2 * | 4/2013 | Platzer et al. ................. 715/784 |
| 2001/0015718 | A1 * | 8/2001 | Hinckley et al. .............. 345/156 |
| 2006/0047704 | A1 * | 3/2006 | Gopalakrishnan ......... 707/104.1 |
| 2006/0097978 | A1 * | 5/2006 | Ng et al. ........................ 345/102 |
| 2006/0218191 | A1 * | 9/2006 | Gopalakrishnan ......... 707/104.1 |
| 2008/0030360 | A1 * | 2/2008 | Griffin ........................... 340/689 |
| 2008/0177994 | A1 * | 7/2008 | Mayer ................................ 713/2 |
| 2008/0263449 | A1 * | 10/2008 | Schwartz et al. .............. 715/723 |
| 2009/0228784 | A1 * | 9/2009 | Drieu et al. .................... 715/235 |
| 2010/0245243 | A1 * | 9/2010 | Jung et al. ..................... 345/157 |
| 2011/0113371 | A1 * | 5/2011 | Parker et al. ................... 715/810 |
| 2011/0161076 | A1 * | 6/2011 | Davis et al. .................... 704/231 |
| 2011/0225547 | A1 * | 9/2011 | Fong et al. ..................... 715/835 |
| 2011/0242142 | A1 * | 10/2011 | Hussain et al. ............... 345/690 |
| 2011/0244919 | A1 * | 10/2011 | Aller et al. ................. 455/556.1 |

(Continued)

FOREIGN PATENT DOCUMENTS

WO 2012018513 A1 9/2012

OTHER PUBLICATIONS

Soupouris, "ioS 6 adjusts metallic button reflections as you tilt your phone," Retrieved from http://www.theverge.com/users/AaronSoup, Jun. 13, 2012, 2 pp.

*Primary Examiner* — Maurice L McDowell, Jr.
(74) *Attorney, Agent, or Firm* — Shumaker & Sieffert, P.A.

(57) ABSTRACT

A computing device includes a user interface module operable by at least one processor to output, for display, a graphical user interface of an application, the graphical user interface including a plurality of elements, each respective element of the plurality of elements being associated with one of a plurality of application features, determine an age for a first application feature of the plurality of application features, the age being a period of time that has elapsed since the first application feature was enabled in the application, generate, based on the age, a visual characteristic that modifies at least one of a chrominance value and a luminance value associated with a first element of the plurality of elements associated with the first application feature, and output, for display, the visual characteristic.

20 Claims, 8 Drawing Sheets

(56) References Cited

U.S. PATENT DOCUMENTS

| | | | |
|---|---|---|---|
| 2011/0252446 A1* | 10/2011 | Jeong et al. | 725/40 |
| 2012/0036433 A1* | 2/2012 | Zimmer et al. | 715/702 |
| 2012/0062445 A1* | 3/2012 | Haddick et al. | 345/8 |
| 2012/0154633 A1* | 6/2012 | Rodriguez | 348/231.99 |
| 2012/0165046 A1* | 6/2012 | Rhoads et al. | 455/456.3 |
| 2012/0166946 A1* | 6/2012 | Bombolowsky | 715/708 |
| 2012/0206485 A1* | 8/2012 | Osterhout et al. | 345/633 |
| 2012/0208592 A1* | 8/2012 | Davis et al. | 455/556.1 |
| 2012/0235900 A1* | 9/2012 | Border et al. | 345/156 |
| 2012/0254804 A1* | 10/2012 | Sheha et al. | 715/834 |
| 2012/0282905 A1* | 11/2012 | Owen | 455/414.1 |
| 2012/0282911 A1* | 11/2012 | Davis et al. | 455/418 |
| 2012/0284122 A1* | 11/2012 | Brandis | 705/14.64 |
| 2012/0290979 A1* | 11/2012 | Devecka | 715/810 |
| 2013/0073998 A1* | 3/2013 | Migos et al. | 715/776 |
| 2013/0111345 A1* | 5/2013 | Newman et al. | 715/716 |
| 2013/0128060 A1* | 5/2013 | Rhoads et al. | 348/207.1 |
| 2013/0166332 A1* | 6/2013 | Hammad | 705/5 |
| 2013/0182117 A1* | 7/2013 | Arseneau et al. | 348/157 |

* cited by examiner

MOBILE DEVICE USER INTERFACE HAVING ENHANCED VISUAL CHARACTERISTICS

CROSS-REFERENCE TO RELATED APPLICATIONS

This application claims the benefit of U.S. Provisional Application No. 61/714,680, filed Oct. 16, 2012, and U.S. Provisional Application No. 61/789,029, filed on Mar. 15, 2013, the entire contents of each of which is hereby incorporated by reference in its entirety.

BACKGROUND

Mobile computing devices, such as mobile phones and tablet computers, are becoming increasingly powerful and ubiquitous, and applications for these computerized devices have begun to offer extensive functionality. Many of these mobile computing devices are provided with several pre-installed applications (often referred to as "apps") that offer at least a basic set of functions (e.g., telephony, photo capture, web browsing, email, and navigation). In addition, numerous such apps are available for downloaded and installation from online app stores or markets.

As the functionality of mobile computing devices and applications executable thereby has expanded, so has the importance of the user interface in ensuring a lightweight and intuitive mechanism for providing input to and receiving feedback from the mobile computing device.

SUMMARY

In one aspect, the disclosure describes a method that includes outputting, by a computing device and for display, a graphical user interface of an application, the graphical user interface including a plurality of elements, each respective element of the plurality of elements being associated with one of a plurality of features, determining, by the computing device, an age for a first application feature of the plurality of application features, the age being a period of time that has elapsed since the first application feature was enabled in the application, generating, by the computing device, based on the age, a visual characteristic that modifies at least one of a chrominance or luminance value associated with a first element of the plurality of elements associated with the first application feature, and outputting, by the computing device and for display, the visual characteristic.

In another aspect, this disclosure describes a method that includes outputting, by a computing device for display, a graphical user interface of an application, the graphical user interface including a plurality of elements, determining, by the computing device, an age for a first element of the plurality of elements, the age being a period of time that has elapsed since the first element was last selected in the application, generating, by the computing device, based on the age of the first element, a visual characteristic that modifies at least one of chrominance or luminance value indicating the age of the first element, and outputting, by the computing device for display, the visual characteristic for the first element.

In another aspect, the disclosure describes a computing device that includes at least one processor, and a user interface module operably by the at least one processor. In accordance with this aspect of the disclosure, the user interface module may be operable by the at least one processor to output, for display, a graphical user interface of an application, the graphical user interface including a plurality of elements, each respective element of the plurality of elements being associated with one of a plurality of features, determine an age for a first application feature of the plurality of application features, the age being a period of time that has elapsed since the first application feature was enabled in the application, generate, based on the age, a visual characteristic that modifies at least one of a chrominance value and a luminance value associated with a first element of the plurality of elements associated with the first application feature, and output, for display, the visual characteristic.

In another example, A device includes at least one processor and a user interface module operable by the at least one processor. The user interface module is operable by the at least one processor to output for display at a display device, a graphical user interface of an application including a plurality of elements, each respective element of the plurality of elements being associated with one of a plurality of features, determine an age for a first application feature of the plurality of application features, the age being a period of time that has elapsed since the first application feature was enabled in the application, generate, based on the age, a visual characteristic that modifies at least one of a respective chrominance or luminance value associated with a first element of the plurality of elements associated with the first application feature, and output for display, the visual characteristic.

The details of one or more examples are set forth in the accompanying drawings and the description below. Other features, objects, and advantages of the disclosure will be apparent from the description and drawings, and from the claims.

DETAILED DESCRIPTION

This disclosure describes techniques for constructing and outputting, from a computing device, a graphical user interface (GUI) in which interface elements have enhanced visual characteristics based on various factors. The enhanced visual characteristics may improve the experience of a user of the computing device by drawing the attention of the user to particular interface elements and, for example, by providing an indication, based on the associated visual characteristic, of a classification of each of the user interface elements.

As one example, a computing device may construct and output user interface elements for an application having visual characteristics indicative of an "age" (e.g., an amount of time since the installation or receipt by the device) of one or more capabilities or features of the application. As a result, a user may be able to more readily distinguish "newer" apps and/or application features from "older" apps and/or application features.

As a second example, the computing device may output user interface elements for an application having visual characteristics based on an amount of time elapsed since a most-recent user selection of or interaction with the respective user interface element. In some instances, the respective user interface element may be associated with a particular capability or feature of application. In this manner, the visual characteristics may provide an indication of application features and associated user interface elements which the user has not recently used or with which the user has not recently interacted. Such visual characteristics may signal to a user which application features are most-frequently used, and thereby more easily identify any unused features of the application.

Figure 1:
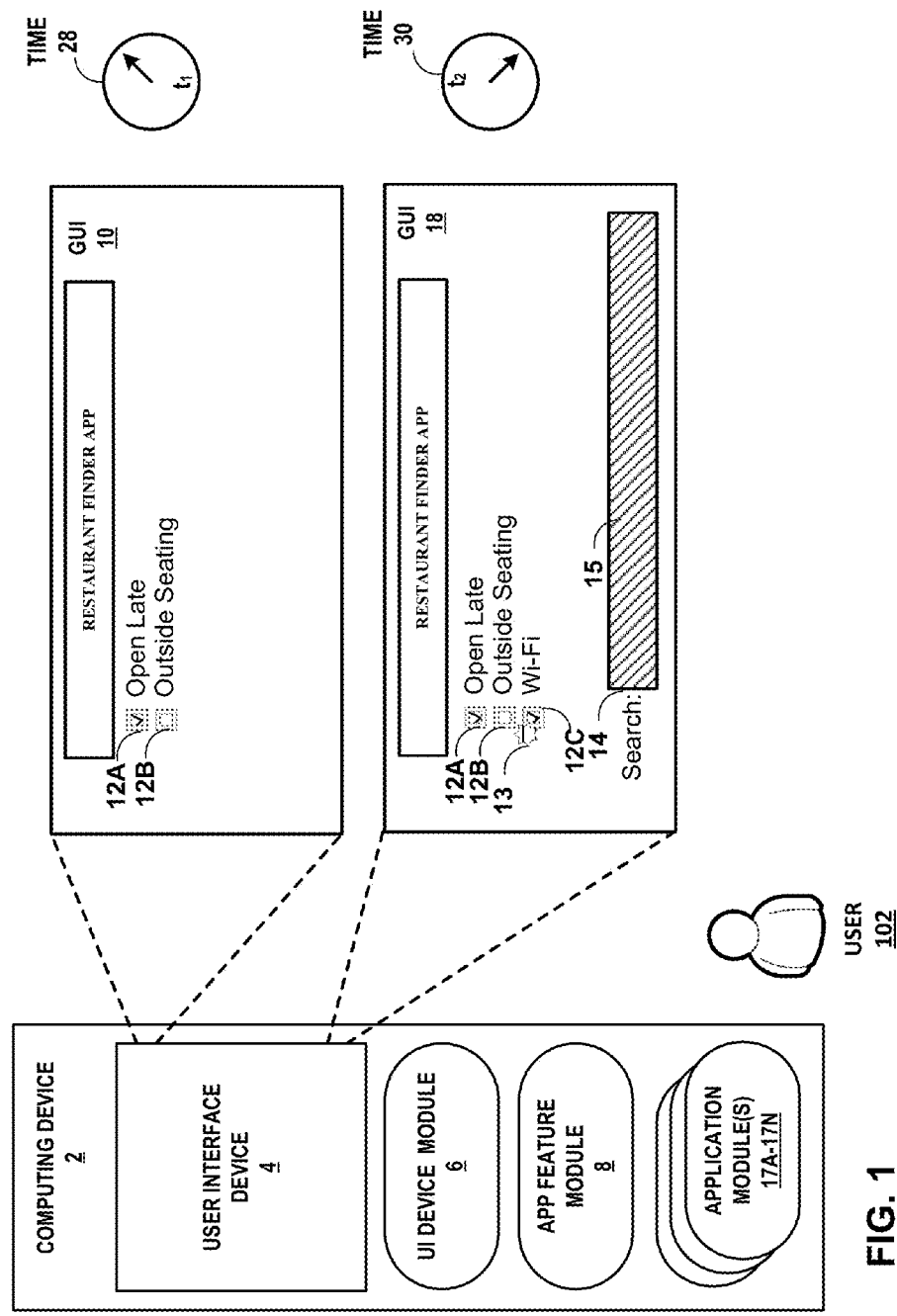
FIG. 1 is a conceptual diagram illustrating an example computing device that generates and outputs enhanced visual characteristics based on various factors in accordance with one or more aspects of the present disclosure.

FIG. 1 is a conceptual diagram illustrating an example computing device that generates and outputs enhanced visual characteristics based on various factors in accordance with one or more aspects of the present disclosure. In the example of FIG. 1, computing device 2 may be a mobile phone. However, in other examples, computing device 2 may be a personal digital assistant (PDA), a desktop computer, a laptop computer, a tablet computer, a portable gaming device, a portable media player, a camera, an e-book reader, a watch, or another type of computing device. Moreover, computing device 2 may include one or more stand-alone devices or may be part of a larger system. User 102 interacts with computing device 2 using various input and output devices, examples of which are shown in greater detail in FIG. 2.

In the example shown in FIG. 1, computing device 2 includes a user interface device (UID) 4, user interface device module 6 (UI device module 6), application feature module 8, and application modules 17A-17N. User 102 may be associated with computing device, 2, and may perform various actions, described in further detail below, using computing device 2.

UID 4 of computing device 2 may function as an input device and/or an output device for computing device 2. For example, UID 4 of computing device 2 may include a presence-sensitive display, such as a touchscreen configured to receive tactile user input from a user of computing device 2. UID 4 may receive tactile user input as one or more taps and/or gestures. UID 4 may detect taps or other gestures in response to the user touching or pointing to one or more locations of UID 4 with a finger or a stylus pen. UID 4 may be implemented using various technologies. For example, UID 4 may be implemented using a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Furthermore, UID 4 may include any one or more of a liquid crystal display (LCD) dot matrix display, light emitting diode (LED) display, organic light-emitting diode (OLED) display, e-ink, or similar monochrome or color display capable of outputting visible information to user 102 of computing device 2.

UID 4 may output a graphical user interface (GUI), such as GUI 10 and GUI 18, which may be related to functionality provided by computing device 2. For example, UID 4 may output GUI 10 and GUI 18, which are associated with one or more of application modules 17A-17N, and which are described in further detail below.

UI device module 6 may comprise hardware or software that interacts with and/or controls UID 4, and which manages the layout and user interaction associated with elements of a GUI. As an example, UI device module 6 may comprise one or more graphics processing units (GPUs), drivers, software, and/or firmware that may control the output and input from UID 4. UI device module 6 may also manage the layout and user interaction with the elements of a user interface, such as GUI 10 and GUI 18, which application modules 17A-17N may generate. In some examples, UI device module 6 may also generate and output enhanced visual characteristics, which may modify luminance and/or chrominance values associated with elements of the user interface based on various factors in accordance with the techniques of this disclosure.

Application modules 17-17N ("application modules 17") represent one or more applications of computing device 2. As some examples, application modules 17 may include a restaurant finder application, a contact management application, which may allow interaction with contacts associated with user 102, for example using text messaging (e.g., SMS or MMS messaging), voice, and video communications. Application modules 17 may also include various applications that user 102 may download and install from an application store or marketplace. User 102 or computing device 2 may update the version or capabilities of one or more of application modules 17. In some examples, the updated applications may include new application capabilities, also referred to herein as software features, which application feature module 8 may monitor.

More specifically, application feature module 8 may monitor installation and usage of individual capabilities provided by application modules 17. In some examples, application feature module 8 may track when new application capabilities are added to each of application modules 17, e.g., by way of a software update. As part of tracking application capabilities, application feature module 8 may determine a date and/or timestamp associated with one or more capabilities of each of application modules 17. Based on the date associated with each application capability, application feature module 8 may determine a visual characteristic for a user interface element associated with that application capability, and UID 4 may output the visual characteristics in accordance with the techniques of this disclosure. In some examples, the visual effects may modify luminance and/or chrominance values associated with elements of the user interface elements. Although shown separately from application modules 17, application feature module 8 may be a component or module integrated within one or more of application modules 17 or within an operating system or other software component of computing device 2.

In the example of FIG. 1, one of application modules 17 (e.g., application module 17A) may generate GUI 10 and GUI 18 at time ($t_1$) 28 and time ($t_1$) 30, respectively. When constructing and outputting GUIs 10, 18, application feature module 8 may determine a respective date (e.g., a timestamp) associated with installation of one or more capabilities of the one of application modules 17, and UID 4 may output user interface elements of GUIs 10, 18 associated with the capabilities to have certain visual characteristics based on the respective dates. In a second example, when constructing GUIs 10, 18, application feature module 8 may determine an age since a user has selected a particular UI element generated by one of application modules 17, and UID 4 may control the visual characteristics for each UI element based on the age As a more detailed illustration of the first example of outputting enhanced visual characteristics, user 102 may, at a time ($t_o$), download and install a restaurant finder application which may include UI elements that are associated with the enhanced visual characteristics. The restaurant application may comprise one of application modules 17, which subsequently cause UID 4 to output GUI 10 at a time ($t_1$) 28 to include user interface elements 12A, and 12B. User interface elements 12A and 12B may be associated with application capabilities that allow user 102 to search for restaurants with various characteristics. Moreover, application feature module 8 determines an age of each of features to which user interface elements 12A and 12B correspond, where the age the feature represents a period of time that has elapsed since the application capability was made available by the software application, either at the time of original installation or software upgrade. Assuming the capabilities associated with user interface elements 12A and 12B are originally present in the restaurant finder application when user 102 installed the restaurant finder application, the age of the capabilities of user interface elements 12A and 12B is the time between the installation of the restaurant finder application at time at a time ($t_0$) and the time ($t_1$) 28 when GUI 10 was constructed.

At a later time ($t_2$) 30, user interface device 4 outputs GUI 18. In between time 28 and time 30, computing device 2 may update the restaurant finder application to a different version of the application having new capabilities. As an example, GUI 18 may include UI elements 12A and 12B which were present in GUI 10, but further includes UI element 12C, and UI element 14. In this example, both UI element 12C and UI element 14 are associated with new application capabilities. For example, element 12C may be associated with a capability that allows user 102 to search for restaurants that have Wi-Fi, and UI element 14 may be associated with a search capability that may allow user 102 to search for restaurants, e.g., based on a textual description of the restaurant. When computing device 2 generates GUI 18, UI device module 6 may construct UI elements 12C, 14 for the new software features so as to have one or more visual characteristics that are indicative of the age of the capabilities. In this example, computing device 2 has output GUI 18 such that UI element 12C associated with the new Wi-Fi property capability has enhanced visual characteristic 13 and UI element 14 associated with the text search capability has enhanced visual characteristic 15. As a result, a user 102 may be able to more readily distinguish newer application features associated with UI elements 12C, 14 from older application features based on the visual characteristics 13, 15.

As a more detailed illustration of the second example described above, application feature module 8 may determine an age associated with UI elements based on the time since user 102 last selected each element, and based on the age of each UI element, UID 4 may output a visual characteristic indicative of the age associated with each UI element. In the example of FIG. 1, user 102 may select UI element 12A at time ($t_1$) 28, but may not have selected UI element 12B. Application feature module 28 may determine an age associated with UI elements 12A and 12B based on the times at which UI elements 12A and 12B were last selected. Accordingly, the age of UI element 12A may be older than the age of UI element 12B. As a result, UI device module 6 may generate, and UID 4 may output, UI elements 12A and 12B of GUI 18 to have visual characteristics indicative of this age difference. In some examples, the enhanced visual characteristics, may modify luminance and/or chrominance values associated with elements, e.g., of UI elements 12A and 12B based on various factors in accordance with the techniques of this disclosure. At time ($t_1$) 30, for example, UID 4 may display UI element 12A to have a first visual characteristic, and the first visual characteristic may differ from a second visual characteristic that is associated with UI element 12B, based on the different ages of UI elements 12A and 12B. For example, UI element 12A may be displayed with certain shading and rendering indicative of an older object, such as a texturing that visually simulates a brittle or fragile state. Alternatively, or in addition, UI element 12 having a newer age may be rendered with bright, clean lines. In this way, user 102 may more easily access and utilize more frequently used features and may more easily identify any unused features of the software application, for example.

As described above, computing device 2 may output enhanced visual characteristics based on various factors in accordance with the techniques of this disclosure. The enhanced visual characteristics may enhance the experience of a user, such as user 102, of computing device 2, by drawing the attention of the user to the interface elements that are associated with the improved visual effects.

Figure 2:
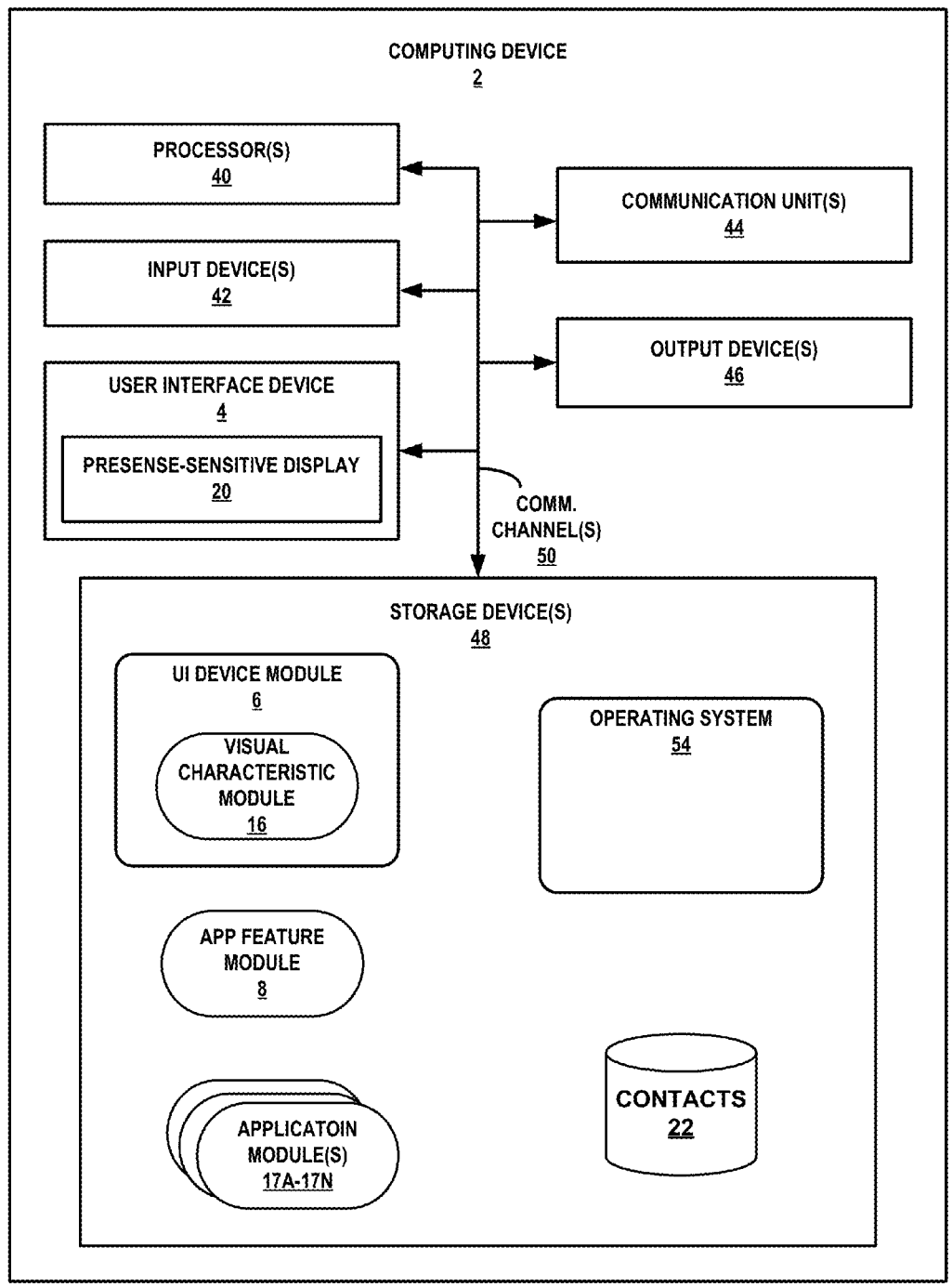
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 2 of FIG. 2 is described below within the context of FIG. 1. As shown in the example of FIG. 2, computing device 2 includes user interface device 4 ("UID 4"), one or more processors 40, one or more input devices 42, one or more communication units 44, one or more output devices 46, and one or more storage devices 48. In this example, UID 4 also includes presence-sensitive display 20.

Storage devices 48 of computing device 2 may also include user interface module 6, application feature module 8, application modules 17A-17N, visual characteristic module 16, contacts 22, and operating system 54. Communication channels 50 may interconnect each of the components 6, 8, 16, 17, 20, 22, 40, 42, 44, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display (e.g., presence-sensitive display 20), touch-sensitive screen, mouse, keyboard, voice responsive system, video camera, microphone, accelerometer, gyroscope, light sensor, or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 2 may communicate with external devices via one or more networks by transmitting and/or receiving network signals on the one or more networks. For example, computing device 2 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 4 of FIG. 2 includes presence-sensitive display 20 (hereafter "display 20"). Computing device 2 may use display 20 as an input device and an output device. For example, display 20 of UID 4 may include a touchscreen configured to receive tactile user input from a user of computing device 2. Display 20 of UID 4 may also include an LED display capable of outputting visible information to the user of computing device 2. UID 4 may present a user interface on display 20, such as GUIs 10, 14 of FIG. 1, that may be related to functionality provided by computing device 2. In some examples, display 20 of UID 4 may present various functions and applications, such as an electronic message client, a contacts GUI, and a notifications GUI.

One or more storage devices 48 within computing device 2 may store information required for use during operation of computing device 2 (e.g., application modules 17 of computing device 2 may store information related to operation of the respective one of one or more applications). Storage devices 48, in some examples, have the primary purpose of being short term and not long-term computer-readable storage mediums. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI interface module 16, visual characteristic module 16, and application modules 17.

Storage devices 48 may also include operating system 54. In some examples, operating system 54 may manage various processes and components of computing device 2, such as storage devices, input, output, and peripheral devices. Operating system 54 may also generate events, e.g., based on timers, and/or interrupts, that applications of computing device 2 may receive, for example using an event handler.

Applications 17 may store a variety of data to storage devices 22, such as contact data ("contacts 22"). Contacts 22 may, for example, comprise a database or other data structure that an application, such as a phone dialer application, a notifications application, or a messaging application may access. Although illustrated as being stored locally on storage devices 48, some contacts of contacts 22 may also be stored remotely, for example in a cloud.

One or more processors 40 may implement functionality and/or execute instructions within computing device 2. For example, processors 40 on computing device 2 may read and execute instructions stored by storage devices 48 that execute the functionality application of UI device module 6, application feature module 8, user interface elements 12A and 12B, visual characteristic module 16, application modules 17, and operating system 54. These instructions executed by processors 40 may cause computing device 2 to store information within storage devices 48 during program execution, such as information related to the age of user interface elements, notification objects, and/or information associated with contacts 22.

As described above with respect to FIG. 1, computing device 2 may be configured to generate and output user interface elements having enhanced visual characteristics based on various factors. In some examples, the visual characteristics may modify at least one of a chrominance and a luminance value associated with the user interface elements. As a first example, storage devices 48 may include application feature module 8 operable to determine an age associated with each of a plurality of features of applications modules 17. Application feature module 8 may include a database or other data that may store the age of each of the features of one of the applications of application modules 17 in storage devices 48. Based on the age of each UI element, application feature module 8 may generate a visual characteristic that is associated with each UI element of the application of application modules 17. In some examples, visual characteristic module 16 may modify the quality of the visual effect before UID 4 outputs the visual characteristic to presence-sensitive display 20. As an example, visual characteristic module 16 may modify the chrominance, luminance, or other properties of the visual characteristic before UID 4 outputs the visual characteristic at presence-sensitive display 20. After visual character module 16 modifies the quality of the visual characteristics, UID 4 outputs the visual characteristics associated with each UI element of the application of application modules 17.

As a second example of generating enhanced visual characteristics, application feature module 8 may also be configured to determine a time since a user, such as user 102 has interacted with a particular user interface element of an application, and based on that time, UID 4 may output different visual characteristics to presence-sensitive display 20. In this example user 102 may select one or more UI elements. Based on the time that user 102 selects a first one of the UI elements of the application, application feature module 8 may store a date on storage devices 48. Based on the date, application feature module 8 may determine an age for the first one of the UI elements of the application. Application feature module 8 may generate visual characteristics, which may modify at least one of a chrominance or luminance value of the first one of the user interface elements, based on the age, which visual characteristic module 16 may modify. After visual characteristic module 16 modifies the visual characteristics, UI device 4 outputs the visual characteristics for display at presence-sensitive display 20. Based on the visual characteristics associated with each of the UI elements, user 102 of computing device 2 may be able to more easily identify application capabilities and UI elements that user 102 has interacted with more recently and less recently.

As described above, computing device 2 may output enhanced visual characteristics based on various factors in accordance with the techniques of this disclosure. The enhanced visual characteristics may enhance the experience of a user, such as user 102, of computing device 2, by drawing the attention of the user to the interface elements that are associated with the improved visual effects.

Figure 3B:
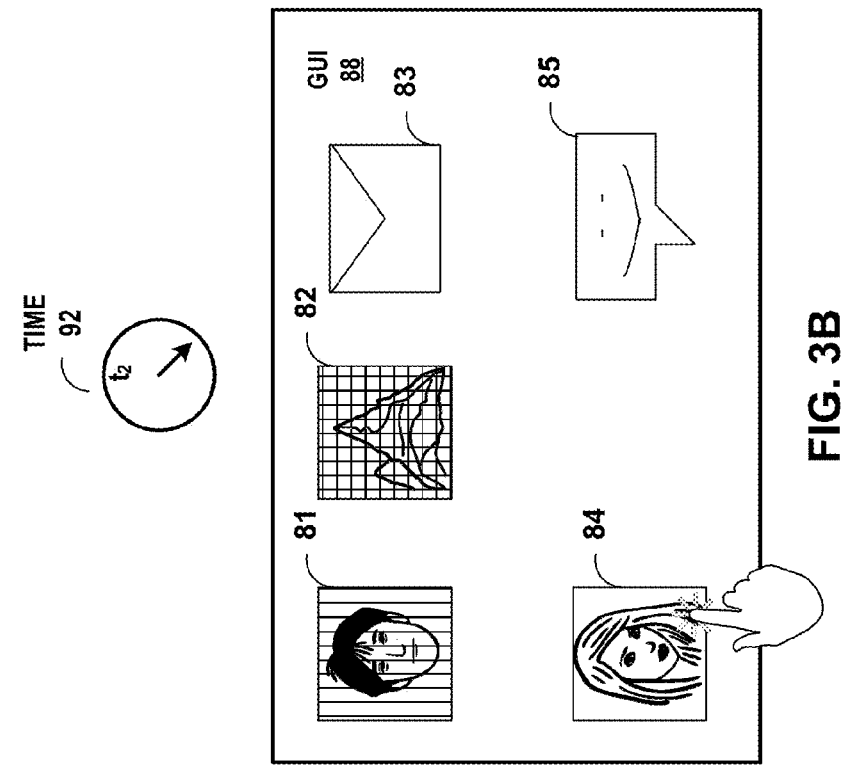
FIGS. 3A-3B are conceptual diagrams that illustrate visual characteristics associated with user interface elements based on a period of time since a user has interacted with the user interface elements, in accordance with one or more aspects of the present disclosure.
Figure 3A:
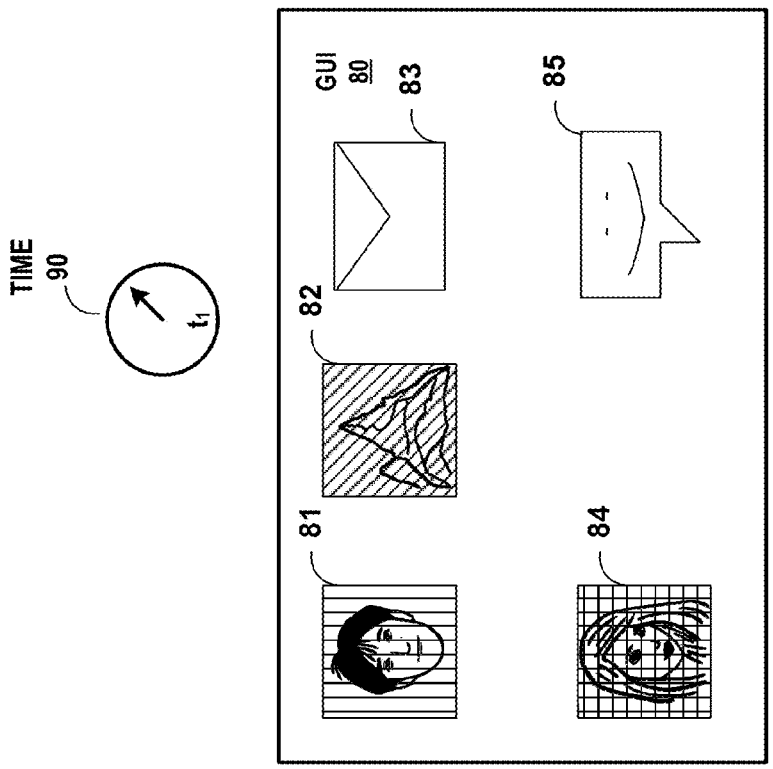

FIGS. 3A-3B are conceptual diagrams that illustrate visual characteristics associated with user interface elements controlled by computing device 2 based on a period of time since a user has interacted with the user interface elements, in accordance with one or more aspects of the present disclosure. FIGS. 3A and 3B illustrate two GUIs, GUI 80, and GUI 88. GUIs 80 and 88 generally include the same user interface elements, i.e., user interface elements 81, 82, 83, 84, and 85. Graphical elements 81, 82, and 84 of GUI 80, and graphical elements 81, and 82 of GUI 88, that include diagonal, horizontal, and/or vertical hashing, may indicate UI elements to which visual characteristic module 16 (FIG. 2) has applied one or more visual characteristics.

In some examples, the visual characteristics applied to UI elements 81, 82, and 84 may modify the chrominance or luminance values associated with UI elements 81, 82, and 84. The visual characteristics may make UI elements appear to user 102 as though they have reflective properties, such as the reflective properties of a piece of metal or a shiny piece of plastic or another material. Visual characteristic module 16 may also adjust various properties of the visual characteristics based on various criteria.

As one example, visual characteristic module 16 may receive a brightness measurement of the environment of computing device 2 from a brightness sensor, which may be one of input devices 44 (FIG. 2). The brightness measurement may indicate an amount of light detected by the brightness sensor. Based on the brightness measurement, visual characteristic module 16 may adjust the intensity of the visual characteristics for each of the user interface elements. As an example, if the detected brightness measurement increases, the intensity of the visual effect, e.g., the reflectivity or shininess may increase or decrease.

Computing device 2 may also adjust the visual characteristics for each of the UI elements of a GUI based on the movement of computing device 2. As an example, an accelerometer, which may comprise one of input devices 44 may detect an indication (e.g., a movement) that computing device 2 has moved, and may generate an indication, such as a signal responsive to detecting the movement indication. Visual characteristic module 16 may receive the indication that computing device 2 has moved, and may update the visual characteristics for each of the UI elements 81, 82, 83, 84, and 85 based on the movement indication. As an example, visual characteristic module 16 may update a reflection characteristic, such as a lens flare effect generated by computing device as if a light source were present. That is, visual characteristic module 16 may dynamically update a graphical depiction of a lens flare due to movement of computing device 2 that would change the position of the computing device relative to the position of the imaginary light source.

Visual characteristic module 16 may update the visual characteristics for each of the UI elements 81-85 based on an image captured using a camera of computing device 2. In this example, the camera may capture an image, which in some cases may comprise an image of a user of computing device 2, such as user 102. Visual characteristic module 16 receives the captured image and updates the visual characteristics for each of UI elements 81-85 such that the visual characteristics include at least a portion of the captured image.

In the example of FIG. 3A, UID 4 outputs GUI 80 for display at presence-sensitive display 20 at time ($t_1$) 90. In accordance with the techniques of this disclosure of generating enhanced visual characteristics based on various factors, application feature module 8 may determine a respective age for each of UI elements 81, 82, 83, 84, and 85. As described with respect to FIGS. 1 and 2, application feature module 8 may keep a record of the various UI elements of an application, such as any of the applications illustrated in FIGS. 1, 3, and 4. Application feature module 8 may keep a record of the last time that a user, such as user 102 has selected each UI element, and may determine age for each UI element that is based on the amount of time that has elapsed since each of UI elements 81, 82, 83, 84, and 85 was last selected in the application. Based on the age of each of UI elements 81-85, visual characteristic module 16 may generate a respective visual characteristic for each of UI elements 81-85, and UID 4 may output the respective visual characteristics for each of the UI elements 81-85.

At a later time ($t_2$) 92, user 102 may interact with UI element 84 of GUI 88. Based on the interaction with UI element 84, application feature module 8 may update the time since UI element 84 was last selected (e.g., the age of the UI element). Application feature module 8 may cause visual characteristic module 16 to update the visual characteristic associated with UI element 84. User interface device 4 may then output the updated visual characteristic for UI element 84.

As examples of how visual effects module 16 generates the visual characteristics for UI elements 81-85 based on the age of UI elements 81-85, UID 4 may no longer display a visual characteristic for UI element 84 based on the updated age of UI element 84 due user 102 selecting UI element 84 at time ($t_1$) 90. Additionally, because time has elapsed between time 92 and time 90, the age of UI elements 81 and 82 in FIG. 3B may have increased. Accordingly, visual characteristic module 16 updates the visual characteristics, and user interface device 4 outputs the updated visual characteristics for UI elements 81 and 82. The different hashings of FIGS. 3A and 3B illustrated with UI elements 81-83 represent changed visual characteristics for UI elements 81 and 82.

Figure 4:
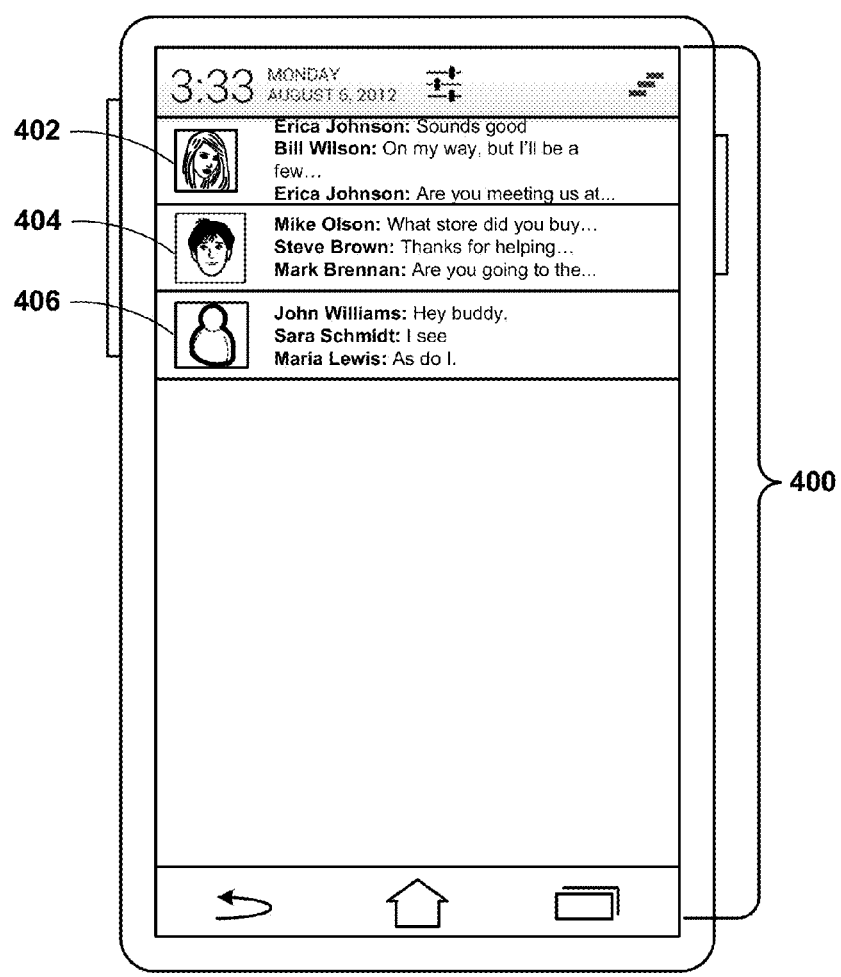
FIG. 4 is a conceptual diagram that illustrates generating and outputting enhanced visual characteristics associated with a user interface elements that represent one or more contacts, in accordance with one or more aspects of the present disclosure.

FIG. 4 is a conceptual diagram that illustrates generating and outputting enhanced visual characteristics associated with a user interface elements that represent one or more contacts, in accordance with one or more aspects of the present disclosure. FIG. 4 illustrates a GUI 400 of computing device 2 that may include user interface elements 402, 404, and 406, each of which may represent one or more contacts associated with user 102 of computing device 2. UI elements 402, 404, and 404 may each comprise a graphical representation of one or more of contacts 22.

GUI 400 may represent, in the example of FIG. 4, an application, such as a notifications application that may inform user 102 of various new events, such as communications that computing device 2 has received since user 102 last interacted with computing device 2. The events may include missed or received phone calls, receipt of messages, such as text and voice messages, received e-mails, and notifications from applications, such as social networking applications.

A module of computing device 2, such as one of application modules 17 may determine a classification of one or more of contacts 22 (e.g., a "preferred" status) based on various criteria, such as frequency of communication that user 102 has had with a particular contact, the time that has elapsed since user 102 has communicated with a particular contact, a number of messages or conversations with a particular contact, or other communication metrics or preferences of user 102. For graphical elements 402, 404, 406 that represent a contact that one of application modules 17 has classified as a preferred contact for user 102, visual characteristic module 16 may generate and user interface device 4 may output a visual characteristic indicative of the status of the contact.

One of application modules 17 may also determine that the contact represented by UI element 404 represents does not correspond to a preferred contact. Based on that determination, visual characteristic module 16 may generate, and user interface device 4 may output a second, different visual characteristic for UI element 404. In this example, UI elements 404 and 406 may correspond to one or more of contacts 22 (FIG. 2).

In some examples, visual characteristic module 16 may also generate the visual characteristic for the UI element associated with each contact based on the communication with the contact and information associated with the contact. For example, visual characteristic module 16 may generate different visual effects for a contact associated with a social network application, than for a contact in a phone application or a text messaging application. In another example, visual characteristic module 16 may generate different visual effects based on the frequency of communication with each contact.

Although GUI 400 is illustrated as a notification application, the techniques of this disclosure and with respect to FIG. 4 may apply to other applications, as well. Some example applications that may output visual characteristics based on the determination that a UI element is associated with a preferred contact may include a phone dialer application, text or voice messaging application, social networking application, or any other application that may include UI elements that correspond to contacts 22 of computing device 2.

In general, visual characteristic module 16 may generate, and user interface device 4 may output any of the visual characteristics described in this disclosure for any of UI elements 402, 404, and 406 that may be associated with any of contacts 22. Such visual characteristics may include shining, shimmering, highlight and/or glimmering effects, and visual characteristics that include at least a portion of an image captured by a camera of computing device 2.

Figure 5:
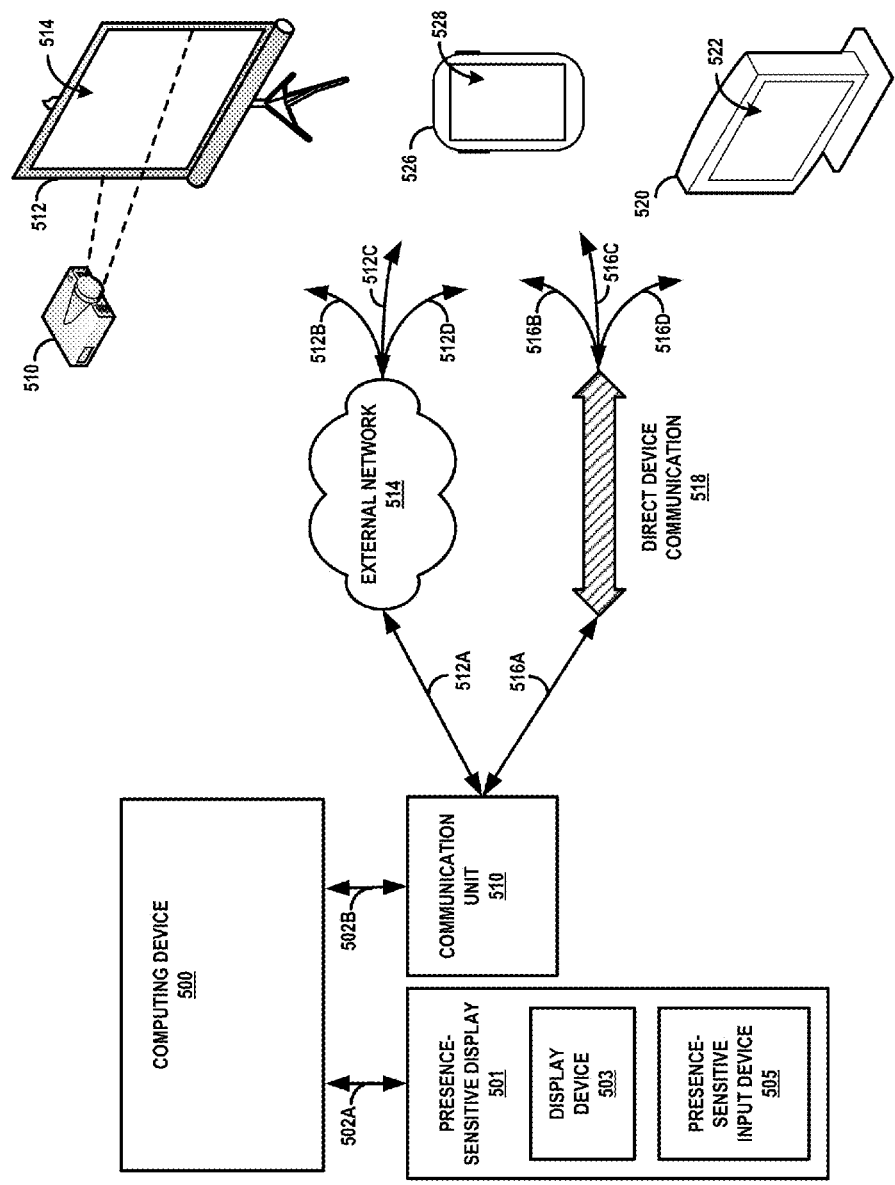
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 500, presence-sensitive display 501, communication unit 510, projector 520, projector screen 522, tablet device 526, and visual display device 130. Although shown for purposes of example in FIGS. 1 and 2 as a stand-alone computing device 500, a computing device may, generally, be any component or system that includes a processor or other suitable computing environment for executing software instructions and, for example, need not include a presence-sensitive display.

As shown in the example of FIG. 5, computing device 500 may be a processor that includes functionality as described with respect to processor 40 in FIG. 2. In such examples, computing device 500 may be operatively coupled to presence-sensitive display 501 by a communication channel 502A, which may be a system bus or other suitable connection. Computing device 500 may also be operatively coupled to communication unit 510, further described below, by a communication channel 502B, which may also be a system bus or other suitable connection. Although shown separately as an example in FIG. 5, computing device 500 may be operatively coupled to presence-sensitive display 501 and communication unit 510 by any number of one or more communication channels.

In other examples, such as illustrated previously in FIGS. 1-2, computing device 500 may be a portable or mobile device such as mobile phones (including smart phones), laptop computers, etc. In some examples, computing device 500 may be a desktop computers, tablet computers, smart television platforms, cameras, personal digital assistants (PDAs), servers, mainframes, etc.

Presence-sensitive display 501, as shown in FIG. 5, may include display device 503 and presence-sensitive input device 505. Display device 503 may, for example, receive data from computing device 500 and display the graphical content. In some examples, presence-sensitive input device 505 may determine one or more user inputs (e.g., continuous gestures, multi-touch gestures, single-touch gestures, etc.) at presence-sensitive display 501 using capacitive, inductive, and/or optical recognition techniques and send indications of such user input to computing device 500 using communication channel 502A. In some examples, presence-sensitive input device 505 may be physically positioned on top of display device 503 such that, when a user positions an input unit over a graphical element displayed by display device 503, the location at which presence-sensitive input device 505 corresponds to the location of display device 503 at which the graphical element is displayed.

As shown in FIG. 5, computing device 500 may also include and/or be operatively coupled with communication unit 510. Communication unit 510 may include functionality of communication unit 44 as described in FIG. 2. Examples of communication unit 510 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 500 may also include and/or be operatively coupled with one or more other devices, e.g., input devices, output devices, memory, storage devices, etc. that are not shown in FIG. 3 for purposes of brevity and illustration.

FIG. 5 also illustrates a projector 520 and projector screen 522. Other such examples of projection devices may include electronic whiteboards, holographic display devices, and any other suitable devices for displaying graphical content. Projector 520 and project screen 522 may include one or more communication units that enable the respective devices to communicate with computing device 500. In some examples, the one or more communication units may enable communication between projector 520 and projector screen 522. Projector 520 may receive data from computing device 500 that includes graphical content. Projector 520, in response to receiving the data, may project the graphical content onto projector screen 522. In some examples, projector 520 may determine one or more user inputs (e.g., continuous gestures, multi-touch gestures, single-touch gestures, etc.) at projector screen using optical recognition or other suitable techniques and send indications of such user input using one or more communication units to computing device 500.

Projector screen 522, in some examples, may include a presence-sensitive display 524. Presence-sensitive display 524 may include a subset of functionality or all of the functionality of UI device 4 as described in this disclosure. In some examples, presence-sensitive display 524 may include additional functionality. Projector screen 522 (e.g., an electronic whiteboard), may receive data from computing device 500 and display the graphical content. In some examples, presence-sensitive display 524 may determine one or more user inputs (e.g., continuous gestures, multi-touch gestures, single-touch gestures, etc.) at projector screen 522 using capacitive, inductive, and/or optical recognition techniques and send indications of such user input using one or more communication units to computing device 500.

FIG. 5 also illustrates tablet device 526 and visual display device 530. Tablet device 526 and visual display device 530 may each include computing and connectivity capabilities. Examples of tablet device 526 may include e-reader devices, convertible notebook devices, hybrid slate devices, etc. Examples of visual display device 530 may include televisions, computer monitors, etc. As shown in FIG. 5, tablet device 526 may include a presence-sensitive display 528. Visual display device 530 may include a presence-sensitive display 532. Presence-sensitive displays 528, 532 may include a subset of functionality or all of the functionality of UI device 4 as described in this disclosure. In some examples, presence-sensitive displays 528, 532 may include additional functionality. In any case, presence-sensitive display 532, for example, may receive data from computing device 500 and display the graphical content. In some examples, presence-sensitive display 532 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 500.

As described above, in some examples, computing device 500 may output graphical content for display at presence-sensitive display 501 that is coupled to computing device 500 by a system bus or other suitable communication channel. Computing device 500 may also output graphical content for display at one or more remote devices, such as projector 520, projector screen 522, tablet device 526, and visual display device 530. For instance, computing device 500 may execute one or more instructions to generate and/or modify graphical content in accordance with techniques of the present disclosure. Computing device 500 may output the data that includes the graphical content to a communication unit of computing device 500, such as communication unit 510. Communication unit 510 may send the data to one or more of the remote devices, such as projector 520, projector screen 522, tablet device 526, and/or visual display device 530. In this way, computing device 500 may output the graphical content for display at one or more of the remote devices. In some examples, one or more of the remote devices may output the graphical content at a presence-sensitive display that is included in and/or operatively coupled to the respective remote devices.

In some examples, computing device 500 may not output graphical content at presence-sensitive display 501 that is operatively coupled to computing device 500. In other examples, computing device 500 may output graphical content for display at both a presence-sensitive display 501 that is coupled to computing device 500 by communication channel 502A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 500 and output for display at presence-sensitive display 501 may be different than graphical content display output for display at one or more remote devices.

Computing device 500 may send and receive data using any suitable communication techniques. For example, computing device 500 may be operatively coupled to external network 514 using network link 512A. Each of the remote devices illustrated in FIG. 5 may be operatively coupled to network external network 514 by one of respective network links 512B, 512C, and 512D. External network 514 may include network hubs, network switches, network routers, etc., that are operatively inter-coupled thereby providing for the exchange of information between computing device 500 and the remote devices illustrated in FIG. 5. In some examples, network links 512A-512D may be Ethernet, ATM or other network connections. Such connections may be wireless and/or wired connections.

In some examples, computing device 500 may be operatively coupled to one or more of the remote devices included in FIG. 5 using direct device communication 518. Direct device communication 518 may include communications through which computing device 500 sends and receives data directly with a remote device, using wired or wireless communication. That is, in some examples of direct device communication 518, data sent by computing device 500 may not be forwarded by one or more additional devices before being received at the remote device, and vice-versa. Examples of direct device communication 518 may include Bluetooth, Near-Field Communication, Universal Serial Bus, WiFi, infrared, etc. One or more of the remote devices illustrated in FIG. 5 may be operatively coupled with computing device 500 by communication links 516A-516D. In some examples, communication links 512A-512D may be connections using Bluetooth, Near-Field Communication, Universal Serial Bus, infrared, etc. Such connections may be wireless and/or wired connections.

In accordance with techniques of the disclosure, computing device 500 may be operatively coupled to visual display device 530 using external network 514. Computing device 500 may output for display at visual display device 530 a graphical user interface of an application including a plurality of elements, each respective element of the plurality of elements being associated with one of a plurality of application capabilities. Presence-sensitive input device 505 may determine a respective age of each one of the plurality of application capabilities, each respective age being a period of time that has elapsed since that application capability was added to the application. Computing device 500 may generate, based on the respective age of each one of the plurality of application capabilities associated with each of the plurality of elements and by the computing device, a respective visual characteristic for each of the plurality of elements. In some examples, the enhanced visual characteristics may modify at least one of a chrominance and a luminance value associated with the plurality of elements. Presence-sensitive input device 505 may output and for display at the display device, the respective visual characteristic for each one of the plurality of application capabilities associated with each of the plurality of elements in accordance with the techniques of this disclosure.

Figure 6:
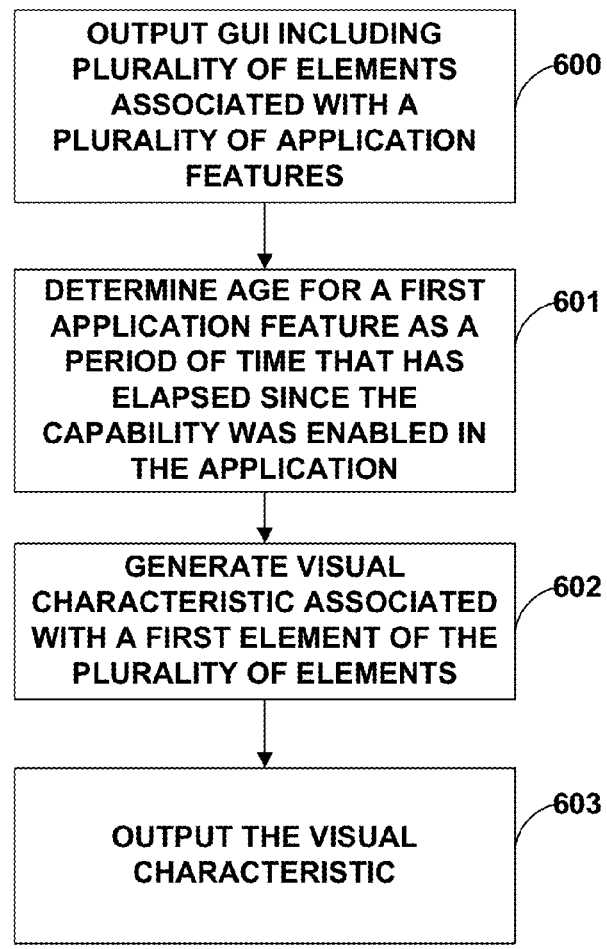
FIG. 6 is a flow diagram illustrating an example operation of the computing device, in accordance with one or more aspects of the present disclosure.

FIG. 6 is a flow diagram illustrating an example operation of the computing device, in accordance with one or more aspects of the present disclosure. The operations of FIG. 6 may be performed by one or more processors of a computing device, processors 40 of computing device 2 illustrated in FIG. 1 and FIG. 2. For purposes of illustration, FIG. 5 is described below within the context of computing devices 2 of FIG. 1 and FIG. 2 or computing device 500 of FIG. 5.

Computing device 2 may output for display, a graphical user interface of an application, the graphical user interface including a plurality of elements, each respective element of the plurality of elements being associated with one of a plurality of application features (600). User interface device 4 may determine an age for a first application feature of the plurality of application features, the age being a period of time that has elapsed since that application feature was enabled in the application (601). Visual characteristic module 16 may generate, based on the age, a visual characteristic that modifies at least one of a chrominance or luminance value associated with the first application feature (602). UID 4 may output and for display at the display device, the visual characteristic (603).

In some examples, a camera coupled to the computing device may capture an image, and each the visual effect may include at least a portion of the image. In some examples, the image may comprise an image of a user associated with the computing device.

The operations of the method illustrated in FIG. 6 may further include capturing, by a light sensor of computing device computing device 2, a brightness measurement of an environment of the computing device, and adjusting, based on the brightness measurement of the environment, an intensity of the visual characteristic.

In some examples, an accelerometer of computing device 2 may detect an indication that the computing device has moved. Computing device 2 may receive the indication that the computing device has moved, and responsive to receiving the indication that the computing device has moved, may update the visual characteristic based on the movement indication. UID 4 may output the updated visual characteristic. In some examples, the visual characteristic comprises one of a glimmer, shimmer, highlight, and shine.

In another example, generating the visual characteristic may comprise generating an intensity for the visual characteristic from the plurality of elements, and the intensity of each visual characteristic may decrease as the age of the application capability associated with that element increases.

Figure 7:
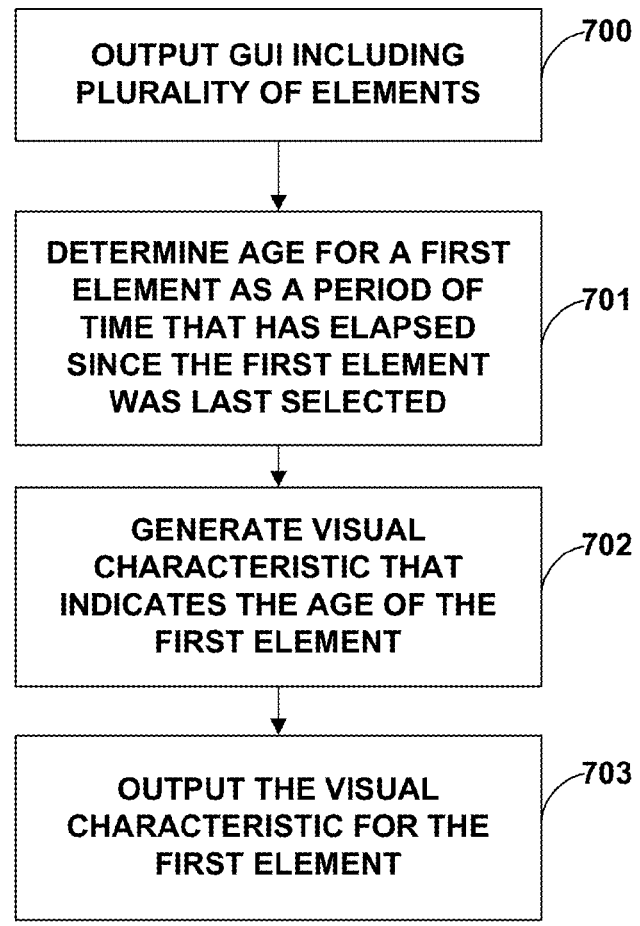
FIG. 7 is a flow diagram illustrating an example operation of the computing device, in accordance with one or more aspects of the present disclosure.

FIG. 7 is a flow diagram illustrating an example operation of the computing device, in accordance with one or more aspects of the present disclosure. The operations of FIG. 7 may be performed by one or more processors of a computing device, processors 40 of computing device 2 illustrated in FIG. 1 and FIG. 2 or computing device 500 of FIG. 5. For purposes of illustration, FIG. 7 is described below within the context of computing devices 2 of FIG. 1 and FIG. 2.

Computing device 2 may output for display, a graphical user interface of an application, the graphical user interface including a plurality of elements (700). Application feature module 8 of computing device 2 may determine an age for a first element of the plurality of elements, the age being a period of time that has elapsed since the first element was last selected in the application (701). Visual characteristic module 16 may generate, based on the respective age of the first element, a visual characteristic that modifies at least one of a chrominance or luminance value that indicates the age of the first element (702), and computing device 2 may output for display, the visual characteristic for the first element (703).

In some examples, a camera coupled to the computing device may capture an image, and the visual effect may include at least a portion of the image. In some examples, the image may comprise an image of a user associated with the computing device.

The operations of the method illustrated in FIG. 7 may further include capturing, by a light sensor of computing device computing device 2, a brightness measurement of an environment of the computing device, and adjusting, based on the brightness measurement of the environment, an intensity of the respective visual characteristic.

In some examples, an accelerometer of computing device 2 may detect an indication that the computing device has moved. Computing device 2 may receive the indication that the computing device has moved, and responsive to receiving the indication that the computing device has moved, may update each respective visual characteristic based on the movement indication. UID 4 may output the updated visual characteristic for display at presence-sensitive display 20. In some examples, each respective visual characteristic comprises one of a glimmer, shimmer, highlight, and shine.

In an example, computing device 2 may generate an intensity for the visual characteristic. The intensity of the respective visual characteristic may decrease as the period of time that has elapsed since that element was last selected increases.

Figure 8:
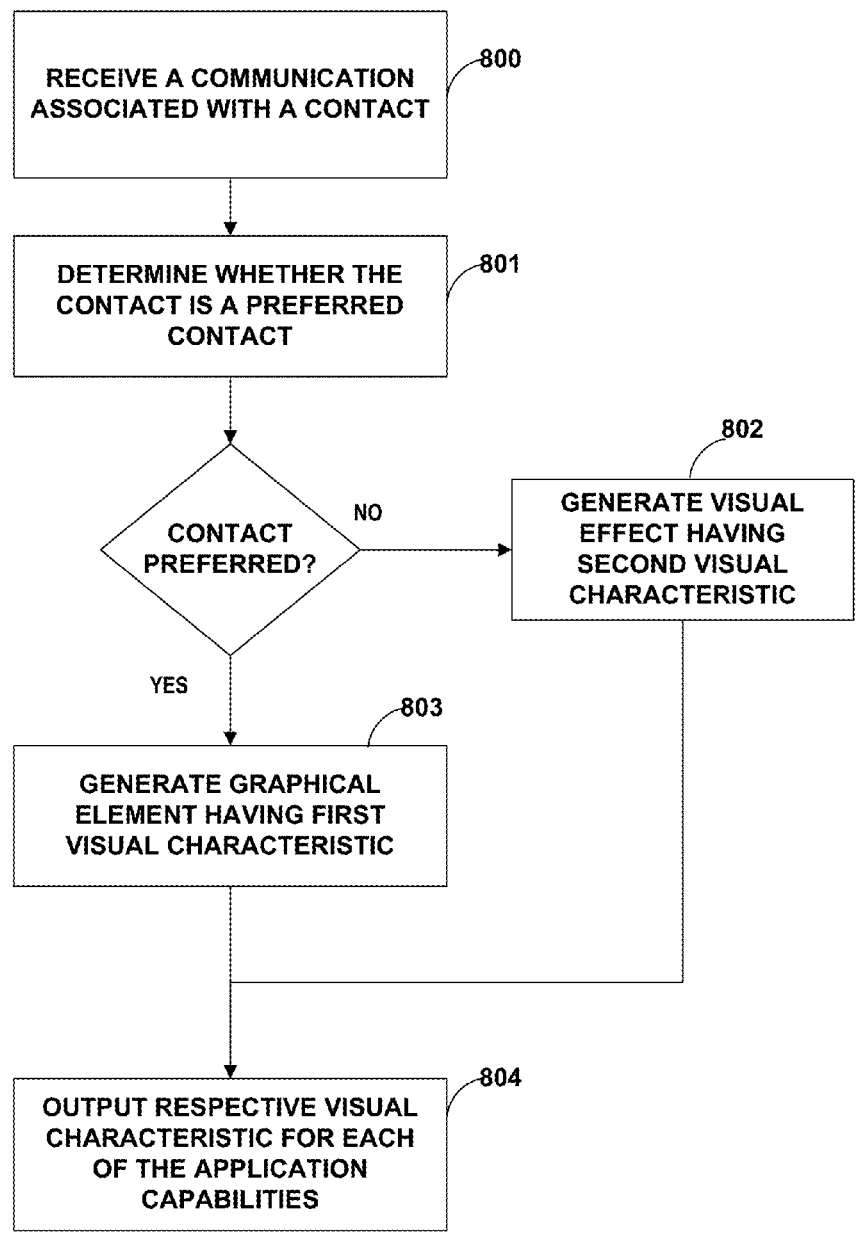
FIG. 8 is a flow diagram illustrating an example operation of the computing device, in accordance with one or more aspects of the present disclosure.

FIG. 8 is a flow diagram illustrating an example operation of the computing device, in accordance with one or more aspects of the present disclosure. The operations of FIG. 8 may also be performed by one or more processors of a computing device, processors 40 of computing device 2 illustrated in FIG. 1 and FIG. 2. For purposes of illustration, FIG. 7 is described below within the context of computing devices 2 of FIG. 1 and FIG. 2 and/or computing device 500 of FIG. 5.

Computing device 2 may receive a communication associated with a contact (800). Computing device 2 may also determine whether the contact is classified as a preferred contact based on a variety of factors, as described above (801). Responsive to determining that the contact is classified as a preferred contact, visual characteristic module 16 may generate based on the communication and information associated with the contact, a graphical element having a first visual characteristic, the first visual characteristic being one of a glimmer, shimmer, highlight, and shine (803). Responsive to determining that the contact is not classified as a preferred contact, visual characteristic module 16 may generate, based on the communication and information associated with the contact, a graphical element having a second visual characteristic, the second visual characteristic being different from the first visual characteristic (802). Computing device 2 may output for display at presence-sensitive display 20, a graphical user interface including the graphical element.

In some examples, a camera coupled to the computing device may capture an image, and each respective visual effect may include at least a portion of the image. In some examples, the image may comprise an image of a user associated with the computing device.

The operations of the method illustrated in FIG. 8 may further include capturing, by a light sensor of computing device computing device 2, a brightness measurement of an environment of the computing device, and adjusting, based on the brightness measurement of the environment, an intensity of each respective visual characteristic.

In some examples, an accelerometer of computing device 2 may detect an indication that the computing device has moved. Computing device 2 may receive the indication that the computing device has moved, and responsive to receiving the indication that the computing device has moved, may update each respective visual characteristic based on the movement indication for output by UID 4.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a computing device and for display, a graphical user interface of an application, the graphical user interface including a plurality of elements, each respective element of the plurality of elements being associated with one of a plurality of features;
   determining, by the computing device, an age for a first application feature of the plurality of application features, the age being a period of time that has elapsed since the first application feature was enabled in the application;
   generating, by the computing device, based on the age, a visual characteristic that modifies at least one of a chrominance or luminance value associated with a first element of the plurality of elements associated with the first application feature; and
   outputting, by the computing device and for display, the visual characteristic.

2. The method of claim 1, further comprising:
   capturing, by a camera coupled to the computing device, an image, wherein the visual characteristic includes at least a portion of the image.

3. The method of claim 2, wherein the image comprises an image representing a user associated with the computing device.

4. The method of claim 1, further comprising:
   capturing, by a light sensor of the computing device, a brightness measurement of an environment of the computing device; and
   adjusting, based on the brightness measurement of the environment and by the computing device, an intensity of the visual characteristic.

5. The method of claim 1, further comprising:
   detecting, by an accelerometer of the computing device, an indication that the computing device has moved;
   receiving, by the computing device, the indication that the computing device has moved;
   responsive to receiving the indication that the computing device has moved, updating the visual characteristic based on the movement indication; and
   outputting the updated visual characteristic.

6. The method of claim 1, wherein generating the visual characteristic comprises:
   generating an intensity for the visual characteristic, the intensity of the visual characteristic decreasing as the age of the application feature associated with the element increases.

7. A method comprising:
   outputting, by a computing device for display, a graphical user interface of an application, the graphical user interface including a plurality of elements;
   determining, by the computing device, an age for a first element of the plurality of elements, the age being a period of time that has elapsed since the first element was last selected in the application;
   generating, by the computing device, based on the age of each of the first element, a visual characteristic that modifies at least one of a chrominance or luminance value that indicates the age of the first element; and
   outputting, by the computing device for display, the visual characteristic for the first element.

8. The method of claim 7, further comprising:
   capturing, by a camera coupled to the computing device, an image;
   and generating, by the computing device, an updated visual characteristic including at least a portion of the image.

9. The method of claim 8, wherein the image comprises an image of a user of the computing device.

10. The method of claim 7, further comprising:
    capturing, by a light sensor of the computing device, a brightness measurement of an environment of the computing device; and
    adjusting an intensity of the visual characteristic based on the brightness measurement of the environment of the computing device.

11. The method of claim 7, further comprising:
    receiving, by the computing device, a movement indication of the computing device; and responsive to receiving the movement indication, updating the visual characteristic based on the movement indication.

12. The method of claim 7, further comprising:
generating an intensity for the visual characteristic, wherein the visual characteristic decreases as the period of time that has elapsed since the first element was last selected increases.

13. A device comprising:
at least one processor;
a user interface module operable by the at least one processor to:
output, for display, a graphical user interface of an application, the graphical user interface including a plurality of elements, each respective element of the plurality of elements being associated with one of a plurality of features;
determine an age for a first application feature of the plurality of application features, the age being a period of time that has elapsed since the first application feature was enabled in the application;
generate, based on the age, a visual characteristic that modifies at least one of a chrominance value and a luminance value associated with a first element of the plurality of elements associated with the first application feature; and
output, for display, the visual characteristic.

14. The device of claim 13, the device further comprising:
a camera to capture an image,
wherein each respective visual characteristic includes at least a portion of the image.

15. The device of claim 14, wherein the image comprises an image of a user associated with the computing device.

16. The device of claim 13, further comprising:
a light sensor to capture a brightness measurement of an environment of the computing device,
wherein the user interface module is further operable by the at least one processor to adjust, based on the brightness measurement of the environment, an intensity of the visual characteristic.

17. The device of claim 13, further comprising:
an accelerometer to detect an indication that the computing device has moved,
wherein the user interface module is further operable by the at least one processor to
receive the indication that the computing device has moved;
responsive to receiving the indication that the computing device has moved,
update the visual characteristic based on the movement indication; and
output the updated visual characteristic.

18. The device of claim 13, wherein the user interface module is further operable by the at least one processor to generate an intensity for the visual characteristic from the plurality of elements, the intensity of each visual characteristic decreasing as the age of the application capability associated with the element increases.

19. A device comprising:
at least one processor;
a user interface module operable by the at least one processor to:
output for display at a display device, a graphical user interface of an application including a plurality of elements;
determine an age for a first element of the plurality of elements, the age being a period of time that has elapsed since the first element was last selected in the application;
generate, based on the age, a visual characteristic that modifies at least one of a respective chrominance or luminance value associated with the first element; and
output for display, the visual characteristic for the first element.

20. The device of claim 19, further comprising:
an accelerometer to detect an indication that the computing device has moved,
wherein the user interface module is further operable by the at least one processor to:
receive the indication that the computing device has moved; and
responsive to receiving the indication, update the visual characteristic based on the movement indication.

* * * * *